(12) United States Patent
Lee et al.

(10) Patent No.: US 8,169,106 B2
(45) Date of Patent: May 1, 2012

(54) ENERGY MANAGEMENT SYSTEM AND CONTROL METHOD USING THE SAME, FOR DETERMINING AN OPERATION MODE OF A HIGH VOLTAGE DIRECT CURRENT SYSTEM

(75) Inventors: Uk Hwa Lee, Gyeongsangbuk-do (KR); Sang Yuen Yuen, Gyeonggi-do (KR); Yoon-Sung Cho, Gyeonggi-do (KR)

(73) Assignee: LS Industrial Systems Co., Ltd., Anyang-si, Gyeonggi-do (KR)

( * ) Notice: Subject to any disclaimer, the term of this patent is extended or adjusted under 35 U.S.C. 154(b) by 374 days.

(21) Appl. No.: 12/363,494

(22) Filed: Jan. 30, 2009

(65) Prior Publication Data

US 2009/0196077 A1   Aug. 6, 2009

(30) Foreign Application Priority Data

Feb. 5, 2008   (KR) .................. 10-2008-0011845

(51) Int. Cl.
*H02J 3/14* (2006.01)

(52) U.S. Cl. ................ 307/31; 307/38; 307/39; 307/40; 307/41; 345/420; 345/621; 345/630; 703/18; 700/97; 700/98

(58) Field of Classification Search .................... 307/31; 345/420, 621, 630; 703/18; 700/97, 98
See application file for complete search history.

(56) References Cited

U.S. PATENT DOCUMENTS

| | | | | |
|---|---|---|---|---|
| 5,262,960 A | * | 11/1993 | Said et al. | 703/18 |
| 5,317,525 A | * | 5/1994 | Taoka et al. | 703/18 |
| 5,490,134 A | * | 2/1996 | Fernandes et al. | 370/466 |
| 5,798,939 A | * | 8/1998 | Ochoa et al. | 700/286 |
| 5,963,734 A | * | 10/1999 | Ackerman et al. | 703/18 |
| 6,751,562 B1 | * | 6/2004 | Blackett et al. | 702/61 |
| 7,120,520 B2 | * | 10/2006 | Seto et al. | 700/297 |
| 7,248,977 B2 | * | 7/2007 | Hart | 702/62 |
| 7,305,335 B2 | * | 12/2007 | Warren | 703/18 |
| 2002/0036430 A1 | * | 3/2002 | Welches et al. | 307/18 |
| 2002/0193978 A1 | * | 12/2002 | Soudier | 703/18 |

(Continued)

OTHER PUBLICATIONS

The Integration of Protection, Monitoring, Control, and Communication Functions in Modern Electrical HV Installations, to Lundqvist et al., Mar. 1997.*

(Continued)

*Primary Examiner* — Rexford Barnie
*Assistant Examiner* — Justen Fauth
(74) *Attorney, Agent, or Firm* — Lee, Hong, Degerman, Kang & Waimey

(57) ABSTRACT

The present disclosure relates to an energy management system (EMS) and a method using the same, wherein the EMS comprises, a communication module receiving a channel information of a high voltage direct current (HVDC) system via a network; a circuit realization unit obtaining a connection information among constituent elements symbolizing the constituent elements among each node in electrical symbols by sequentially following pre-set nodes of the HVDC system, and forming the HVDC system by connecting the symbolized constituent elements using electrical lines by using the channel information of HVDC system received by the communication module; a system analyzing unit analyzing an operation mode of the HVDC system through the connection information among the constituent elements of the HVDC system obtained by the circuit realization unit; and a controller managing and controlling the HVDC system by giving an energy management command in response to the operation mode analyzed by the system analyzing unit.

7 Claims, 7 Drawing Sheets

U.S. PATENT DOCUMENTS

| | | | |
|---|---|---|---|
| 2003/0205938 A1* | 11/2003 | Andarawis et al. | 307/11 |
| 2004/0083087 A1* | 4/2004 | Rehtanz et al. | 703/18 |
| 2005/0033481 A1* | 2/2005 | Budhraja et al. | 700/286 |
| 2005/0149312 A1* | 7/2005 | McGaughy | 703/14 |
| 2007/0213956 A1* | 9/2007 | Nasle et al. | 702/182 |
| 2008/0109205 A1* | 5/2008 | Nasle | 703/18 |
| 2009/0083019 A1* | 3/2009 | Nasle | 703/18 |
| 2009/0099832 A1* | 4/2009 | Nasle | 703/18 |
| 2011/0276189 A1* | 11/2011 | Tang et al. | 700/293 |

OTHER PUBLICATIONS

Innovative Technology in the Moyle Interconnector, to Smith et al., Nov. 2001.*

A New Modeling Approach to Protective Relaying and Fault Information Systems, to Zhanjun et al., Nov. 2004.*

* cited by examiner

ENERGY MANAGEMENT SYSTEM AND CONTROL METHOD USING THE SAME, FOR DETERMINING AN OPERATION MODE OF A HIGH VOLTAGE DIRECT CURRENT SYSTEM

CROSS-REFERENCE TO RELATED APPLICATION

The present application is based on, and claims priority from, Korean Application Numbers 10-2008-0011845, filed Feb. 5, 2008, the disclosure of which is incorporated by reference herein in its entirety.

BACKGROUND

The following description relates to an energy management system (EMS) and a control method using the same, and more particularly to an energy management system (EMS) and a control method using the same, capable of determining an operation mode of a high voltage direct current (HVDC) using system information inputted from the EMS via a network.

There may be two types of power channel coupling methods in which one type is to be coupled with an existing alternating current (AC) power system to one or more loads such as, but are not limited to, household appliances and other energy consuming devices without use of intermediate components, and the other is to be coupled with a power system to loads by converting an alternating current (AC) to a direct current (DC) using an AC-DC converter. Herein, the phrase "coupled with" is defined to mean directly connected to or indirectly connected with through one or more intermediate components. Such intermediate components may include both hardware and software based components.

Recently, interests have increased on the method of coupling the power channel to loads using the AC-DC converter instead of the method dispensing with an intermediate component. This is because the method using the AC-DC converter has an advantage in terms of cost when the power is supposed to be transmitted to a long distance location. Furthermore, the method using the AC-DC converter is capable of transmitting a large capacity of power without affecting the AC power system, and is connectible to other systems of different frequencies. Meanwhile, a high voltage direct current (HVDC) system using an AC-DC converter has been locally set up here in Korea between a southern town known as Haenam and a southernmost Jaeju island.

FIG. 1 is a schematic block diagram illustrating a high voltage direct current (HVDC) system that connects a power channel between two local areas.

Referring to FIG. 1, the HVDC system may comprise: a first transformer 110 connected to an AC bus line 100 of a first area and a second transformer 112; a first converter unit 120 converting an AC inputted from the first transformer 110 and the second transformer 112 to a DC and a second converter unit 122; a first inverter unit 124 and a second inverter unit 126 that convert DC to AC; a third transformer 114 and a fourth transformer 116 that convert the voltage of the AC converted by the first and second inverter unit 124 and 126, and are connected to an AC bus line 101 of a second area; a first DC line 102 connecting the first converter unit 120 to the first inverter unit 124 and a second DC line 103 connecting the second converter unit 122 to the second inverter unit 126; a total of 18 circuit breakers 131~148 for protecting each constituent element comprising a system and the high voltage direct current system; and a first bypass line 104 and second bypass line 105 for transmitting the power detouring an accident section during an accident. The first converter unit 120 and the second converter unit 122 may include four converters, and the first and second inverter unit 124 and 126 may include four inverters.

Meanwhile, the HVDC system needs an effective power supply that is stable in response to a system status, the function of which is performed by an energy management system (EMS). That is, the EMS is an automatic control system capable of collecting data of nation-wide power stations and major substations for production of economic electric power and provision of the power to loads, whereby a power system network can be generally controlled and loads can be effectively distributed.

The EMS now analyzes a system based on actual operation information of the HVDC system. The actual operation information of the HVDC system may be obtained by an operator of a HVDC substation. To be more specific, a manager of the EMS (hereinafter referred to as EMS manager) may obtain the actual operation information of the HVDC system via communication (e.g., telephone communication) with an HVDC substation operator.

Using the aforementioned method, the EMS can receive the operation information from the EMS operator to generate an electric circuit of HVDC system based on the inputted operation information. A channel is analyzed based on the electric circuit information (i.e., connection information among electrical elements comprising the HVDC system) thus generated to provide an energy management for power control. Furthermore, the electrical circuit of the HVDC system may be displayed on a screen for the EMS operator to view.

For example, the EMS operator obtains normal operation mode information via communication with an HVDC substation operator to input the normal operation mode information to the EMS. The EMS generates the electric circuit of the HVDC system based on the inputted normal operation mode information, as depicted in FIG. 2, and performs the power control by analyzing the system based on the generated electric circuit information.

However, the aforementioned method suffers from a drawback in that erroneous system analysis may be made by mistakes of the operator as the operation information of the HVDC system is acquiesced from the operator, making it difficult to cope with sudden happenings of accidents.

For instance, in a case the HVDC substation operator makes a wrong judgment on an operation mode to send to the EMS operator operation information different from actual operation information, the wrong operation information may be inputted to an EMS application program, and a wrong interpretation of the system may be made, resulting in provision of wrong energy management.

Another drawback is that the EMS manager may not obtain the operation information on the HVDC system due to interrupted communications with the HVDC substation operator, whereby the EMS may fail to perform the power control based on the actual operation mode of the HVDC system.

SUMMARY

Accordingly, the present disclosure is intended to solve the aforementioned disadvantages and to provide an energy management system and method for monitoring HVDC system using the same, capable of determining an operation mode of a HVDC necessary for system analysis of power control using system information inputted from the EMS via a network.

In one general aspect of the present disclosure, an Energy Management System (EMS) comprises: a communication module receiving a channel information of a high voltage direct current (HVDC) system via a network; a circuit realization unit obtaining a connection information among constituent elements symbolizing the constituent elements among each node in electrical symbols by sequentially following pre-set nodes of the HVDC system, and forming the HVDC system by connecting the symbolized constituent elements using electrical lines by using, the channel information of HVDC system received by the communication module; a system analyzing unit analyzing an operation mode of the HVDC system through the connection information among the constituent elements of the HVDC system obtained by the circuit realization unit; and a controller managing and controlling the HVDC system by giving an energy management command in response to the operation mode analyzed by the system analyzing unit.

Implementations of this aspect may include one or more of the following features.

An order of nodes is set up in such a manner that a point where electrical impedances are changed by the constituent elements included in the HVDC system is designated as a node.

The constituent elements include at least one of a transformer, an inverter, a converter and a circuit breaker.

The EMS of claim 3, wherein the channel information includes at least one of a circuit breaker status information, a DC voltage information and a power information.

The circuit realization unit connects or disconnects the circuit breaker via the circuit breaker status information included in the channel information to obtain the connection information among the constituent elements included in the HVDC system in a case the constituent element is the circuit breaker.

In another general aspect of the present disclosure, the control method comprising: receiving channel information of a high voltage direct current (HVDC) system via a network; symbolizing the constituent elements among each node in electrical symbols by sequentially following pre-set nodes of the HVDC system by using the channel information of HVDC system, and obtaining connection information among constituent elements comprising the HVDC system by connecting the symbolized constituent elements using electric lines; and determining an operation mode of the HVDC system using the connection information among the constituent elements included in the HVDC system.

Implementations of this aspect may include one or more of the following features.

The constituent elements include at least one of a transformer, an inverter, a converter and a circuit breaker, and the channel information includes at least one of circuit breaker status information, DC voltage information and power information.

The obtaining step of connection information among the constituent elements comprising the HVDC system includes connecting or disconnecting the circuit breaker via the circuit breaker status information included in the channel information, and obtaining connection information among the constituent elements comprising the HVDC system in a case the constituent element is a circuit breaker.

The present disclosure may provide that an electrical circuit of a HVDC system can be generated by channel information inputted from a network without any human intervention, and an operation mode of the HVDC system can be judged by the generated electric circuit information (connection information among constituent elements of the HVDC system), whereby a sudden occurrence of accident can be overcome, and an accurate channel analysis can be realized.

The present disclosure may provide that the constituent elements included in the electrical circuit of the HVDC system can be expressed by electrical codes corresponding thereto, and voltages or direct current information included in the channel information inputted via the network can be included to obtain detailed information necessary for channel analysis.

The present disclosure may provide that power control can be effectively performed using the EMS in the long run.

DETAILED DESCRIPTION

The EMS and the method using the same according to the present disclosure will be described in detail with reference to the accompanying drawings. Detailed descriptions of well-known functions, configurations or constructions are omitted for brevity and clarity so as not to obscure the description of the present disclosure with unnecessary detail.

Figure 1:
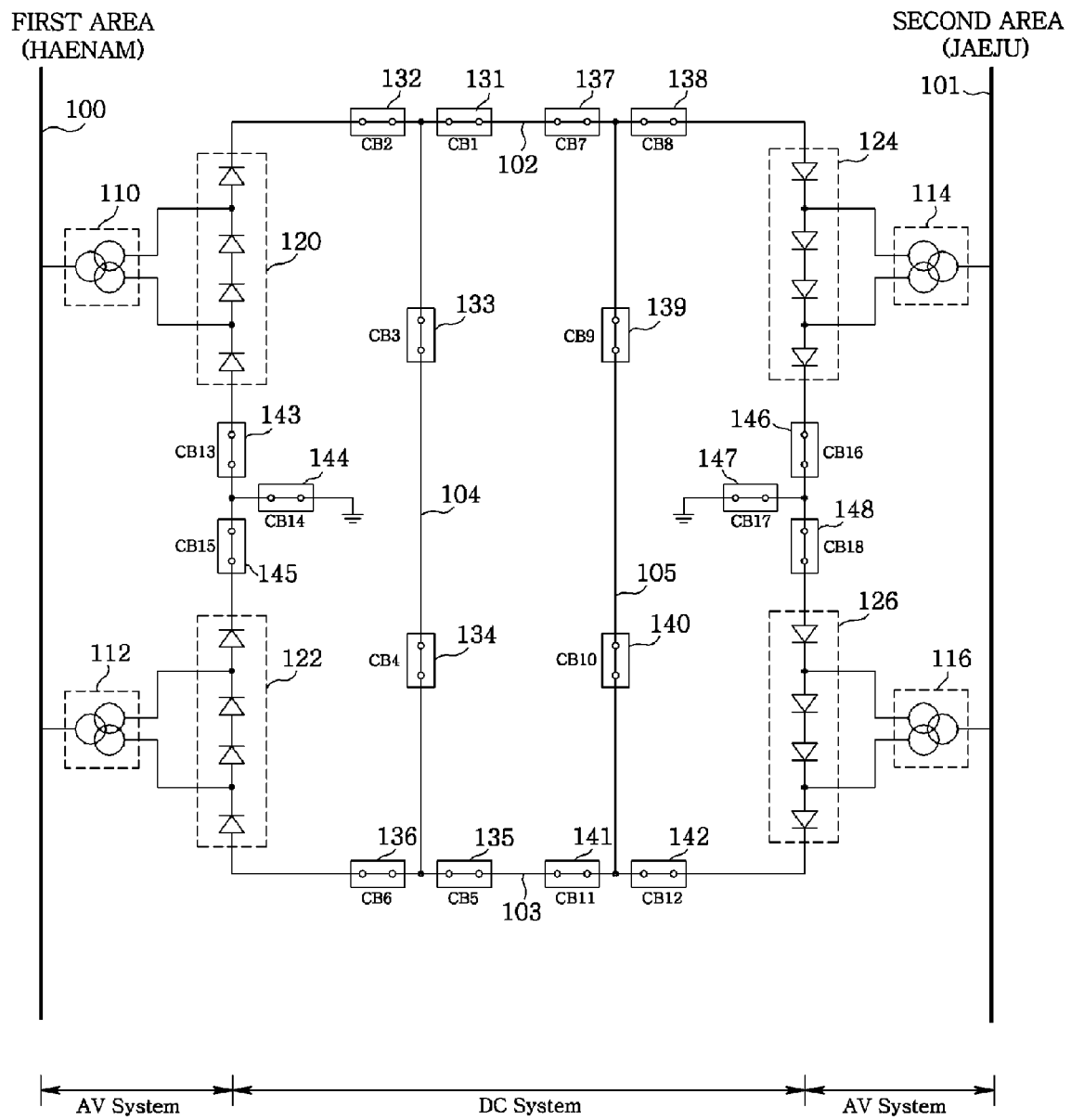
FIG. 1 is a schematic view illustrating an HVDC system coupling power channels among areas.
Figure 2:
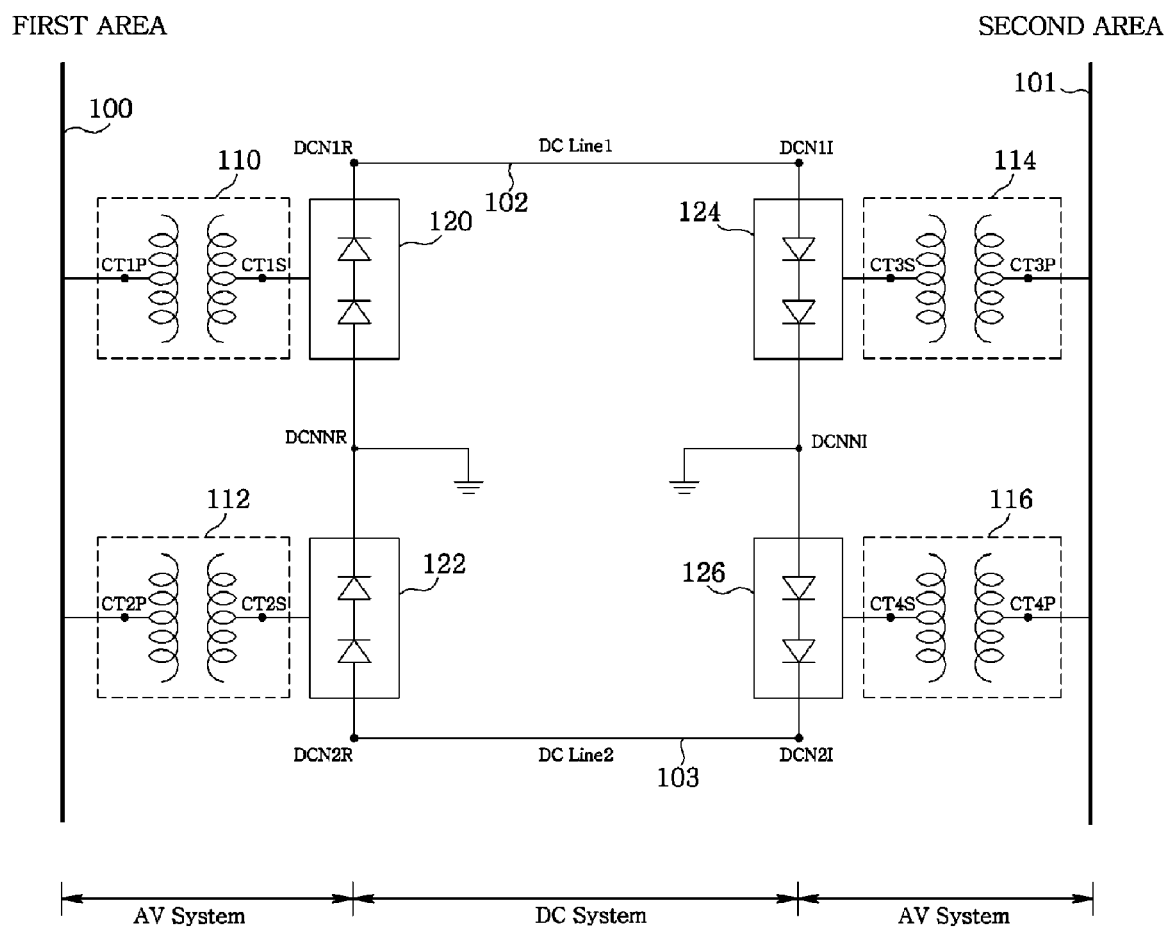
FIG. 2 is a schematic view illustrating an exemplary implementation of a circuit of HVDC in a, system of EMS according to prior art.
Figure 3:
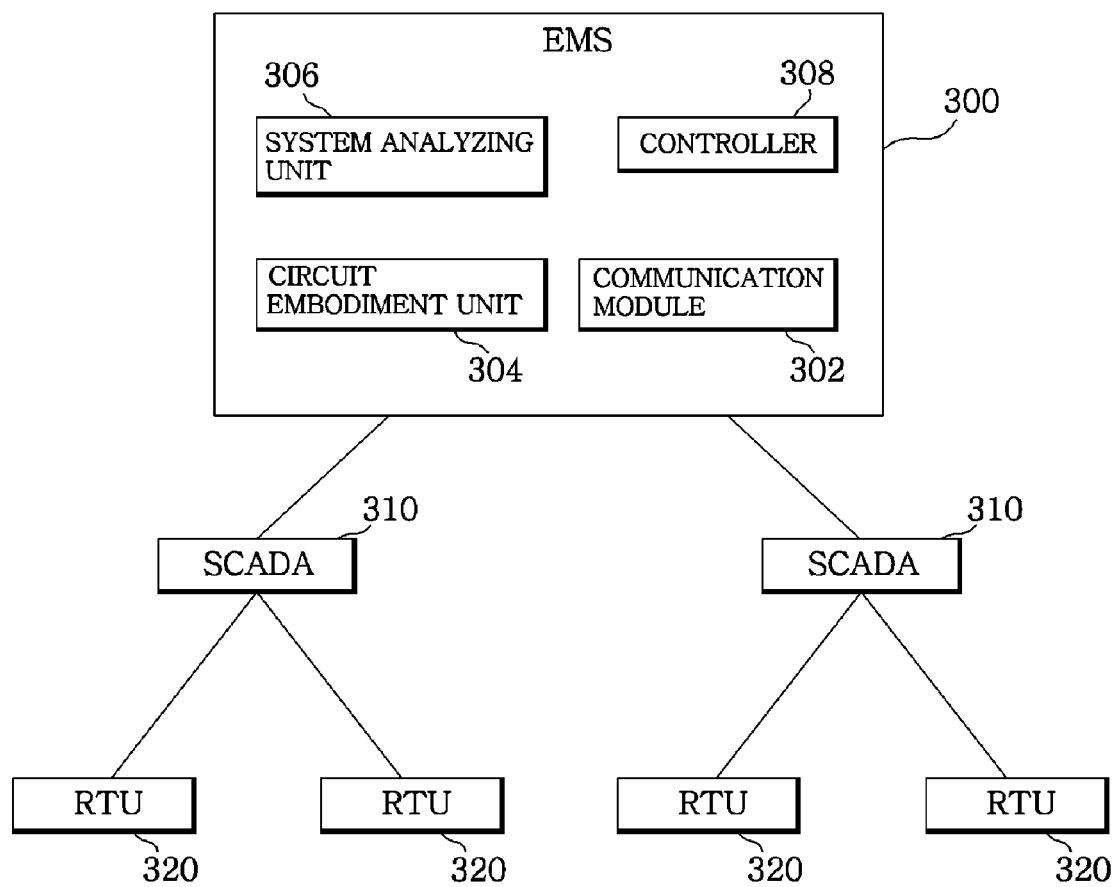
FIG. 3 is a schematic view illustrating an entire configuration of a power control system according to the present disclosure.

FIG. 3 is a schematic view illustrating an entire configuration of a power control system according to the present disclosure.

Referring to FIG. 3, the power control system may include a remote terminal unit (RTU, 320), a supervisory control and data acquisition (SCADA, 310) system, and an energy management system (EMS, 300).

The RTU 320 is a field device installed at a remote area power consumption (W), reactive power consumption (VAR. Volt-Ampere Reactive), transformer temperature data, information on theft, fire and circuit breaker status and sends the collected information to the SCADA 310 via wired/wireless communication devices and communication lines. The RTU 320 may acquire the circuit breaker status information, DC voltage information and power information from an HVDC power distribution system.

The RTU 320 is also a device that receives a control command from the SCADA 310 and performs a controlling function by online in real time response to the received control command.

The SCADA 310 is a device for monitoring or controlling at least one RTU 320 in a centralized control method. The SCADA 310 may transmit the data collected by the RTU 320 to the EMS 300 via wired/wireless communication lines.

The EMS 300 is a large-sized power channel control system that collects information on an entire power supply system from the SCADA 310 controls the operation of power generating facility connected to the channels in an optimum condition by monitoring and performs an economic energy management by using an effective management of power system. One EMS 300 is installed at an entire channel, and there is locally a central EMS that controls a whole power system of the Korean peninsula, except that there is also a Jaeju island EMS that controls Jaeju area channels. The EMS 300 according to the present disclosure corresponds to the central EMS.

The EMS 300 according to the present disclosure may include a circuit generating algorithm capable of creating an electrical circuit of HVDC system. Therefore, the EMS 300 according to the present disclosure may include a communication module 302 for communication, a circuit realization unit 304, a system analyzing unit 306 and a controller 308.

The circuit realization unit 304 receives channel information including circuit breaker status information of the HVDC system from the SCADA 310 via the communication module 302 to generate an electric circuit of the HVDC system. The system information may further include DC voltage information and power information.

To this end, when a point is where electrical impedances are changed by electrical elements (hereinafter referred to as constituent elements) such as a transformer, an inverter, a converter and a circuit breaker that form the HVDC system, the point is designated as a node in the circuit realization unit 304, and the designated node information is stored. The circuit realization unit 304 may also store information on constituent elements to be connected to each designated node, and electrical code shapes relative to each constituent element.

Figure 4:
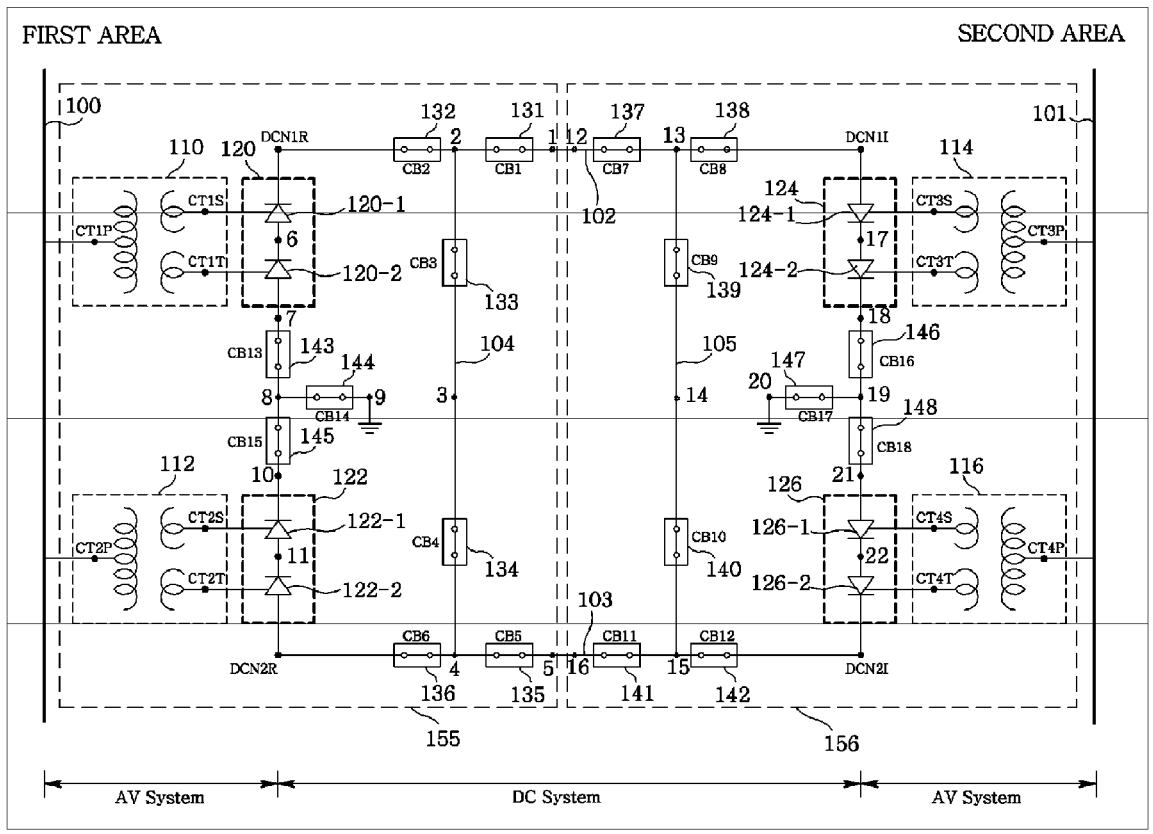
FIG. 4 is a schematic view illustrating an exemplary implementation in which nodes and electrical symbols of each constituent element for embodying a circuit of the HVDC in a system of EMS.

Now, referring to FIG. 4, the constituent elements including the transformer, the inverter, the converter and the circuit breaker are symbolized in electrical symbols. Furthermore, FIG. 4 illustrates that a point connected by each constituent element, i.e., a point where electrical impedances are changed, is designated as a node.

A point for connecting a first converter unit 120 to a first DC line 102, a point for connecting a second converter unit 122 to a second DC line 103, a point for connecting a first inverter unit 124 to the first DC line 102, and a point for connecting a second inverter unit 126 to the second DC line 103 are respectively set up as a DC node DCN1R, a DC node DCN2R, a DC node NCN1I and a DC node DCN 21.

Each tab of a first transformer 110 is set up as CT1P (AC node), CT1S (secondary node) and CT1T (tertiary node), each tab of a second transformer 112 is set up as CT2P, CT2S and CT2T, each tab of a third transformer 114 is set up as CT3P, CT3S and CT3T, and each tab of a fourth transformer 116 is set up as CT4P, CT4S and CT4T.

Furthermore, four converters in the first converter unit 120 and the second converter unit 122 are bound into two groups, each having two converters, and symbolized in two groups of converters 120-1, 120-2, 122-1 and 122-2, where connecting points of the symbolized converters 120-1, 120-2, 122-1 and 122-2 are designated as nodes 6 and 11. At the same time, four converters in the first inverter unit 124 and the second inverter unit 126 are bound into two groups, each having two inverters, and symbolized in two groups of inverters 124-1, 124-2, 126-1 and 126-2, where connecting points of the symbolized converters 124-1, 124-2, 126-1 and 126-2 are designated as nodes 17 and 22.

Now, the circuit of the HVDC system is divided into a converter unit side 155 and an inverter unit side 156 based on a median line of the first DC line 102 and the DC line 103. A node by a circuit breaker CB1 which is a central point of the first DC line 102 of the converter unit side 155 is designated as No. 1, and node numbers are sequentially designated up to a central point of the second DC line 103 along a first bypass line 104. Successively, node numbers are designated up to the second converter unit 122 from the first converter unit 120 connected to the first DC line 102. Node numbers are also designated in the inverter unit side 156 in the same manner as that of the converter unit.

To be more specific, a node by a circuit breaker CB10 which is a central point of the first DC line 102 is designated as 12, and node numbers are designated up to a central point of the second DC line 103 along with a second bypass line 105. Node numbers are designated up to the second inverter unit 126 from the first inverter unit 124 connected to the first DC line 102. It should be apparent that points may be numbered by using methods other than the designation of node numbers as used above.

The circuit realization unit 304 may symbolize each constituent element starting from the node number 1 based on the system information and pre-stored information, and connect each constituent element using electrical lines. If the constituent element is a circuit breaker, the circuit breaker may be connected or disconnected using circuit breaker status information included in the system information to generate an electric circuit of the HVDC system.

Now, the circuit of the HVDC system will be described in detail with reference to FIGS. 5 to 7.

For exemplary purpose, in a case that a circuit breaker status information included in the system information is given as circuit breakers CB3 (133), CB4 (134), CB9 (139) and CB10 (140) being opened and that remaining circuit breakers being closed, the circuit realization unit 304 symbolizes a circuit breaker CB2 (131) connected from a pre-set node 1 to node 1. In circuit breakers CB2 (132) and CB3 (133) connected to a node 2 of the circuit breaker CB1 (131), the circuit breaker CB2 (132) is symbolized as being closed, while the circuit breaker CB3 (133) is symbolized as being opened, where the two circuit breakers are connected by electric lines. Furthermore, searching of constituent elements connected to DCN1R of the circuit breaker CB2 (132) is terminated.

A circuit breaker CB4 (134) connected to node 3 of circuit breaker DB3 (133) is symbolized as being opened, and circuit breakers CB5 (135) and CB6 (136) connected to node 4 is symbolized as being closed. Searching is terminated as constituent elements connected to node 5 of circuit breaker CB5 (135) can be no longer possible. Searching of constituent elements on node DCN2R of circuit breaker CB6 (136) is also stopped. As described above, the circuit breakers which are constituent elements on the DC lines on the converter side 156 and circuit breakers which are constituent elements on the bypass lines are symbolized, but the circuit breakers are connected or disconnected based on the system information including the circuit breaker status information, and connected by circuit lines. At this time, in a case the circuit breakers CB3, CB4, CB9 and CB10 connected to the first and second bypass lines 104 and 105 are all opened, the first and second bypass lines may be omitted.

Furthermore, a converter 1 (120-1) connected by starting from DCNI4 node is symbolized, and a secondary tab of the first transformer (110) connected to a node CT1S of the converter 1 (120-1) is symbolized. Furthermore, a converter 2 (120-2) connected to node 6 of the converter 1 (120-1) is symbolized, a tertiary tab of the first transformer 110 connected to a node CT1T of the second converter 2 (120-2) is symbolized, and an AC side tab connected to node CT1P is symbolized.

A circuit breaker CB13 (143) connected to node 7 of the converter 2 (120-2) is symbolized as being closed, and circuit breakers CB14 (144) and CB15 (145) connected to node 8 of circuit breaker CB13 (143) is symbolized as being closed. An earth symbol connected to node 9 of a circuit breaker CB14 (144) is symbolized, and a converter 3 (122-1) connected to node 10 of circuit breaker CB15 (155) is also symbolized. A secondary tab of the second transformer 112 connected to node CT2S of converter 3 (122-1) is symbolized, and a converter 4 (122-2) connected to node 11 of the converter 3 (122-1) is symbolized. At last, converter side 156 is finalized by symbolizing a tertiary tab of the second transformer 112 connected to node CT2T of converter 4 (122-2), and symbolizing an AC side tab connected to node CT2P to allow finishing at node DCN2R of converter 4 (122-2).

Furthermore, a circuit breaker CB7 (137) connected to node 12 starting from node 12 is symbolized as being closed, a circuit breaker CB8 (138) connected to node 13 of circuit breaker CB7 (137) is symbolized as being closed, and circuit breaker CB9 (139) is symbolized as being opened, where the electric lines are connected accordingly. A circuit connection is terminated at node DCN1I of circuit breaker CB8 (138). Furthermore, a circuit breaker CB10 (140) connected to node 14 of circuit breaker CB9 (139) is symbolized as being opened, and CB11 (141) and CB12 (142) connected to node 15 are symbolized as being closed. The circuit connection is terminated, because the constituent elements connected to node 16 of circuit breaker CB11 (141) can no longer be found. At the same time, circuit connection is also stopped at DCN21 node of circuit breaker CB12 (142). Thus, constituent elements on DC lines at the inverter side and bypass lines are symbolized, where the circuit lines are connected accordingly.

Still furthermore, an inverter 1 (124-1) connected by starting from DCN1I is symbolized, and a secondary tab of the third transformer 124 connected to node CT3S of the inverter 1 (124-1) is symbolized. An inverter 2 (124-2) connected to node 17 of inverter 1 (124-1) is symbolized, a tertiary tab of the third transformer 124 connected to node CT3T of inverter 2 (124-2) is symbolized, and an AC side tab connected to node CT3P is symbolized. Furthermore, a circuit breaker CB16 (146) connected to node 18 of the inverter 2 (124-2) is symbolized as being closed, and circuit breakers CB17 (146) and CB 18 (148) connected to node 19 of circuit breaker CB16 (146) are symbolized as being closed. An earth symbol connected to node 20 of circuit breaker CB17 (147) is symbolized and an inverter 3 (126-1) connected to node 21 of circuit breaker CB18 (148) is symbolized, and a secondary tab of a fourth transformer 116 connected to node CT4S of inverter 3 (126-1) is symbolized. An inverter 4 (126-2) connected to node 22 of inverter 3 (126-1) is symbolized, and a tertiary tab of the fourth transformer 116 connected to node CT4T of inverter 4 (126-2) is symbolized. Furthermore, an AC side tab connected to node CT4P is symbolized to allow terminating at node DCN21 of the inverter 4 (126-2). As a result, an electric circuit of an HVDC system is generated as shown in FIG. 5.

Figure 6:
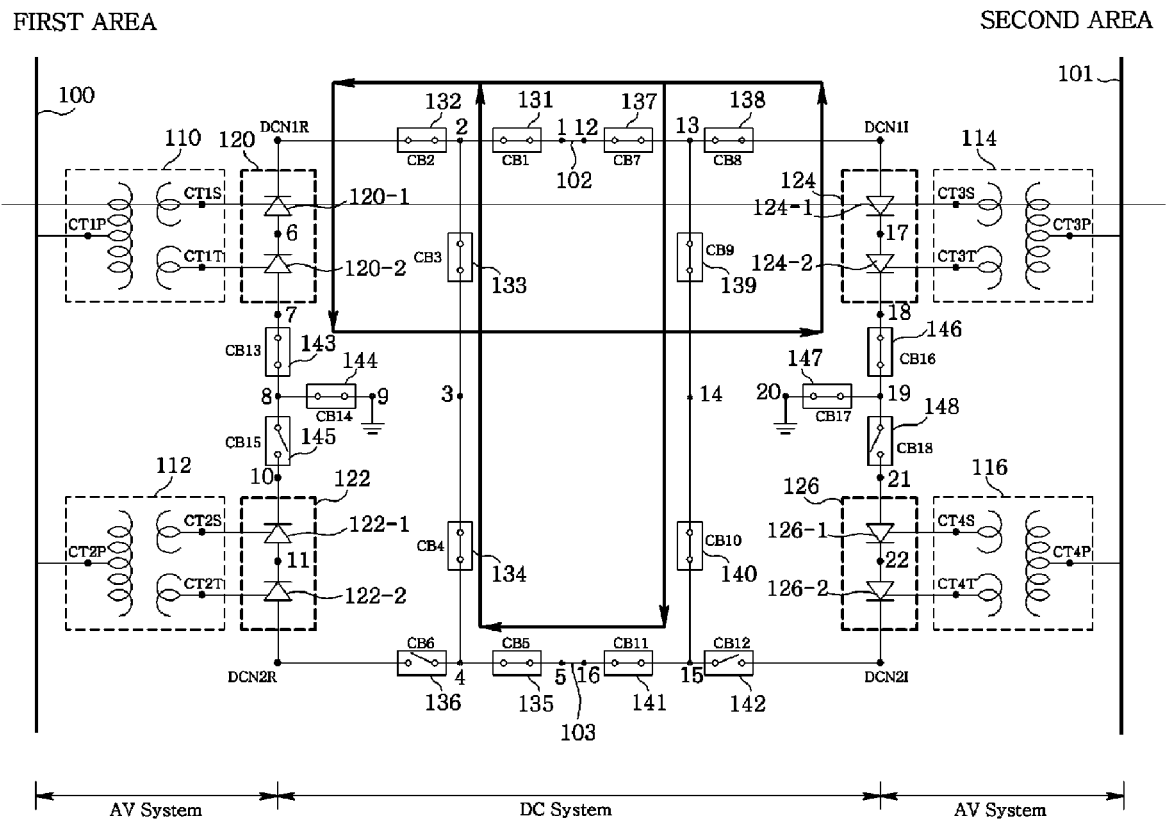

In a case the circuit breakers CB6 (136), CB12 (142), CB15 (145) and CB18 (148) are opened and remaining circuit breakers receive system information of closed status, the circuit realization unit 304 may form an electric circuit as shown in FIG. 6. Furthermore, in a case the circuit breakers CB3 (133), CB4 (134), CB5 (135), CB9 (139), CB10 (140) and CB12 (142) are in an opened and remaining circuit breakers receive system information of closed status, an electric circuit may be formed as illustrated in FIG. 7.

The realization unit 304 may transmit thus-generated electric circuit information (connection information among constituent elements of the HVDC system) to a system analyzing unit 306. Successively, the system analyzing unit 306 may determine a current operation mode of the HVDC system via the electric circuit information inputted from the circuit realization unit 304 to analyze the system.

Figure 5:
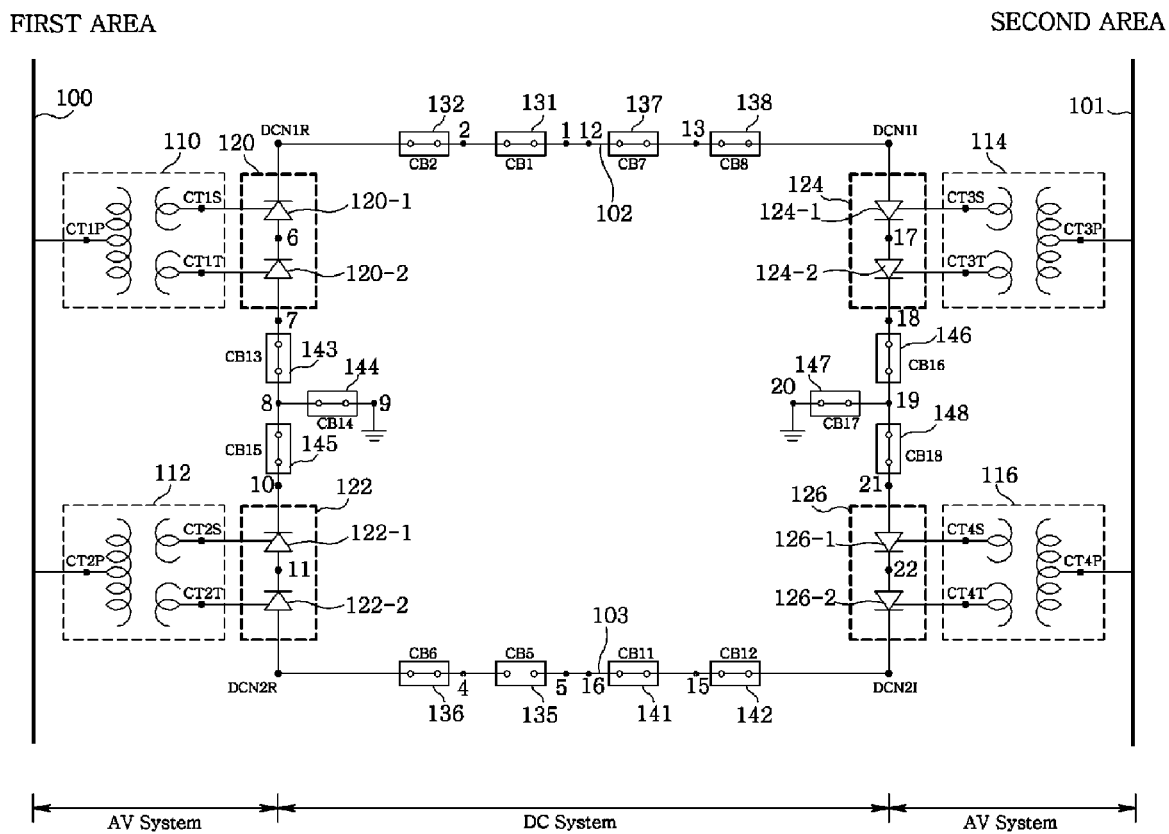
FIG. 5, FIG. 6 and FIG. 7, are a schematic view illustrating an exemplary implementation of a circuit of the HVDC in a system of EMS according to the present disclosure.
Figure 7:
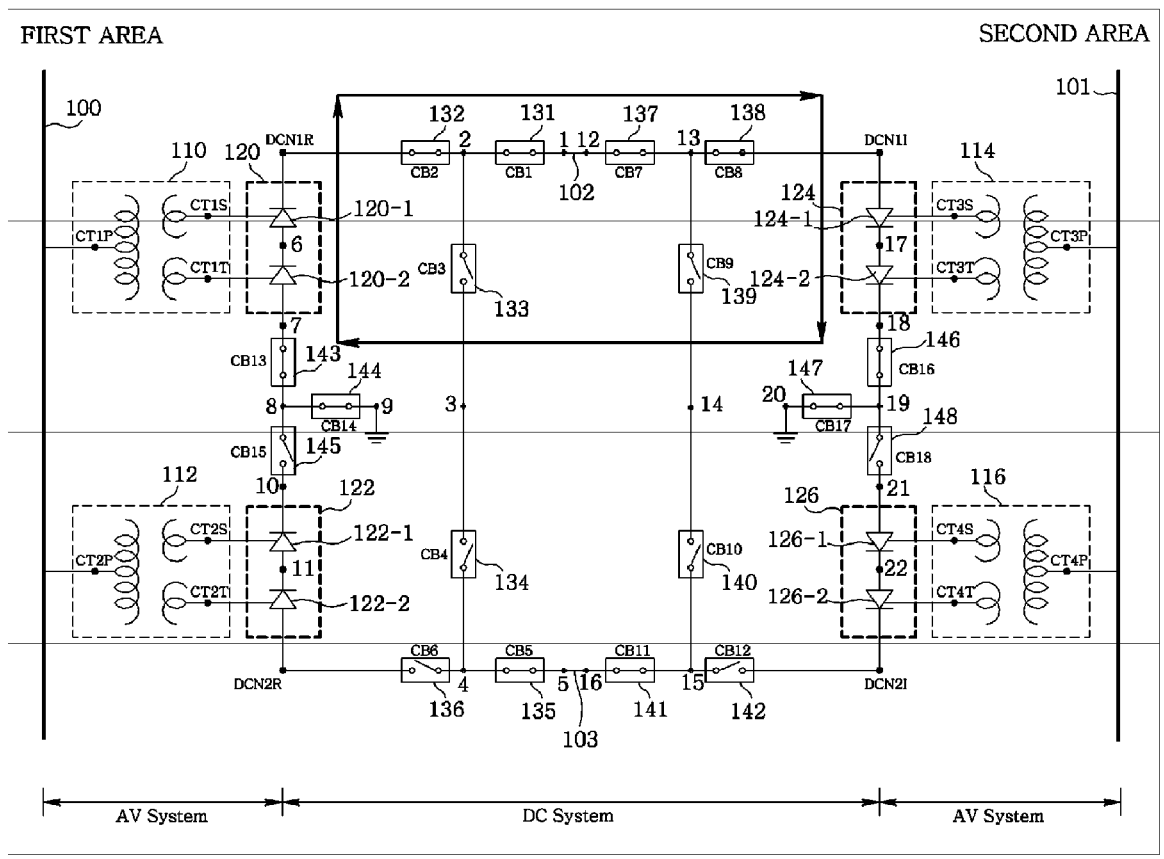

For exemplary purpose, the current operation mode is determined as a normal operation mode by the electric circuit formed as shown in FIG. 5, the current operation mode is determined as a bypass operation mode by the electric circuit formed as shown in FIG. 6, and the current operation mode is determined as a blocking operation mode by the electric circuit as shown in FIG. 7. It can be known that power transmission is performed to a flow direction shown in FIG. 6 in case of bypass operation mode, and power transmission is conducted to a flow direction shown in FIG. 7 in case of blocking operation mode.

The controller 308 may manage and control the power system by giving an energy management command via system information analyzed by the system analyzing unit 306.

Still other exemplary implementations will become readily apparent to those skilled in this art from reading the above-recited detailed description and drawings of certain exemplary implementations. It should be understood that numerous variations, modifications, and additional implementations are possible, and accordingly, all such variations, modifications, and implementations are to be regarded as being within the spirit and scope of the appended claims.

What is claimed is:

1. An Energy Management System (EMS) for controlling operation of a power generating facility connected to channels in optimum condition according to information regarding an entire power supply system received from a supervisory control and data acquisition (SCADA) system centralizing control of at least one remote terminal unit (RTU) installed at a remote area, the EMS comprising:
   a communication module for receiving channel information regarding a high voltage direct current (HVDC) system via a network;
   a circuit realization unit for generating an electric circuit representation of the HVDC system based on the received channel information, the generated electric circuit representation comprising a plurality of symbols, each of the plurality of symbols representing one of a plurality of constituent electric elements of the HVDC system, and connection information comprising one or more connective lines located between the plurality of symbols and indicating one or more electrical connections between the plurality of constituent electric elements;
   a system analyzing unit for determining an operation mode of the HVDC system based on the connection information of the generated electric circuit representation of the HVDC system; and
   a controller for managing and controlling the HVDC system by providing an energy management command in response to the determined operation mode,
   wherein the plurality of constituent electric elements include at least a transformer, an inverter, a converter or a circuit breaker.

2. The EMS of claim 1,
   wherein the received channel information indicates a change in electrical impedance, and
   wherein the circuit realization unit is for designating the change in electrical impedance as a node of the generated electric circuit representation.

3. The EMS claim 1, wherein the received channel information includes at least circuit breaker status information, DC voltage information or power information.

4. The EMS of claim 3,
wherein the plurality of constituent electric elements include the circuit breaker,
wherein the received channel information includes the circuit breaker status information, and
wherein the generated electric circuit representation indicates a connection status of the circuit breaker based on the circuit breaker status information.

5. A control method using an energy management system (EMS) for controlling operation of a power generating facility connected to channels in optimum condition according to information regarding an entire power supply system received from a supervisory control and data acquisition (SCADA) system centralizing control of at least one remote terminal unit (RTU) installed at a remote area, the method comprising:
receiving channel information regarding a high voltage direct current (HVDC) system via a network;
generating an electric circuit representation of the HVDC system based on the received channel information, the generated electric circuit representation comprising a plurality of symbols, each of the plurality of symbols representing one of a plurality of constituent electric elements of the HVDC system, and connection information comprising one or more connective lines located between the plurality of symbols and indicating one or more electrical connections between the plurality of constituent electric elements; and
determining an operation mode of the HVDC system using the connection information of the generated electric circuit representation of the HVDC system,
wherein the plurality of constituent electric elements include at least a transformer, an inverter, a converter or a circuit breaker.

6. The method of claim 5, wherein the received channel information includes circuit breaker status information, DC voltage information or power information.

7. The method of claim 6,
wherein the plurality of constituent electric elements include the circuit breaker,
wherein the received channel information includes the circuit breaker status information, and
wherein the generated electric circuit representation indicates a connection status of the circuit breaker based on the circuit breaker status information.

\* \* \* \* \*